US011359722B2

(12) United States Patent
Maheshwari et al.

(10) Patent No.: US 11,359,722 B2
(45) Date of Patent: Jun. 14, 2022

(54) MULTINODE MULTI-USE O-RING AND METHOD FOR FORMING A SEAL

(71) Applicant: Applied Materials, Inc., Santa Clara, CA (US)

(72) Inventors: Shagun P. Maheshwari, San Jose, CA (US); Yao-Hung Yang, Santa Clara, CA (US); King F. Lee, San Leandro, CA (US); Andrew Yu, San Francisco, CA (US); Aniruddha Pal, San Jose, CA (US); Tom K. Cho, Los Altos, CA (US); Chien-Min Liao, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 291 days.

(21) Appl. No.: 16/517,299

(22) Filed: Jul. 19, 2019

(65) Prior Publication Data

US 2020/0025292 A1 Jan. 23, 2020

Related U.S. Application Data

(60) Provisional application No. 62/700,461, filed on Jul. 19, 2018.

(51) Int. Cl.
*F16J 15/02* (2006.01)
(52) U.S. Cl.
CPC .................................. *F16J 15/022* (2013.01)
(58) Field of Classification Search
CPC ..................................................... F16J 15/022
See application file for complete search history.

(56) References Cited

U.S. PATENT DOCUMENTS

| 5,579,718 | A | 12/1996 | Freerks |
| 6,435,519 | B1 | 8/2002 | White |
| 6,523,833 | B1 * | 2/2003 | Ishigaki ................ F16J 15/025 |
| | | | 277/549 |
| 6,776,875 | B2 | 8/2004 | Gujer et al. |

(Continued)

FOREIGN PATENT DOCUMENTS

| DE | 102019214641 A1 * | 3/2021 | ............... F16K 1/46 |
| EP | 2746626 A1 | 6/2014 | |

(Continued)

OTHER PUBLICATIONS

The Performance Advantages of a Quad-Ring vs. an O-ring, <https://www.gallagherseals.com/blog/the-performance-advantages-of-a-quad-ring-vs-an-o-ring/>, retrieved Apr. 18, 2019.

(Continued)

*Primary Examiner* — Vishal A Patel
(74) *Attorney, Agent, or Firm* — Patterson + Sheridan LLP; B. Todd Patterson

(57) ABSTRACT

A sealing member is provided, including a plurality of nodes and a plurality of antinodes. Each sealing member can be rotated to expose nondamaged lobes for sealing, and prevents the sealing member from falling out of the lobed groove. A chamber is provided, including a groove that the sealing member is placed in. A method of rotating and placing the sealing member is provided, including a rotation to expose nondamaged portions of the sealing member.

10 Claims, 11 Drawing Sheets

(56) References Cited

U.S. PATENT DOCUMENTS

| | | | | |
|---|---|---|---|---|
| 8,181,972 | B2* | 5/2012 | Tsuji | F16K 51/02 |
| | | | | 277/644 |
| 9,314,864 | B2* | 4/2016 | Budd | B23K 3/0607 |
| 2006/0220326 | A1* | 10/2006 | Leadley-Brown | F16J 15/062 |
| | | | | 277/609 |
| 2011/0076848 | A1 | 3/2011 | Datta et al. | |

FOREIGN PATENT DOCUMENTS

| | | |
|---|---|---|
| EP | 2981744 B1 | 11/2017 |
| JP | 2002130481 A | 5/2002 |

OTHER PUBLICATIONS

Quad rings, <http://standard-rubber.com/quad-rings.htm>, retrieved Apr. 18, 2019.
Dovetail o-ring grovoe design, <http://www.sealanddesign.com/page/o-ring-groove-design-dovetail>, retrieved Apr. 18, 2019.
International Search Report and Written Opinion for PCT/US2019/038018, dated Oct. 4, 2019.
Gteek.com, "Seals," dated Apr. 29, 2017, <https://web.archive.org/web/20170429063230/www.gteek.com/Seals>.

\* cited by examiner

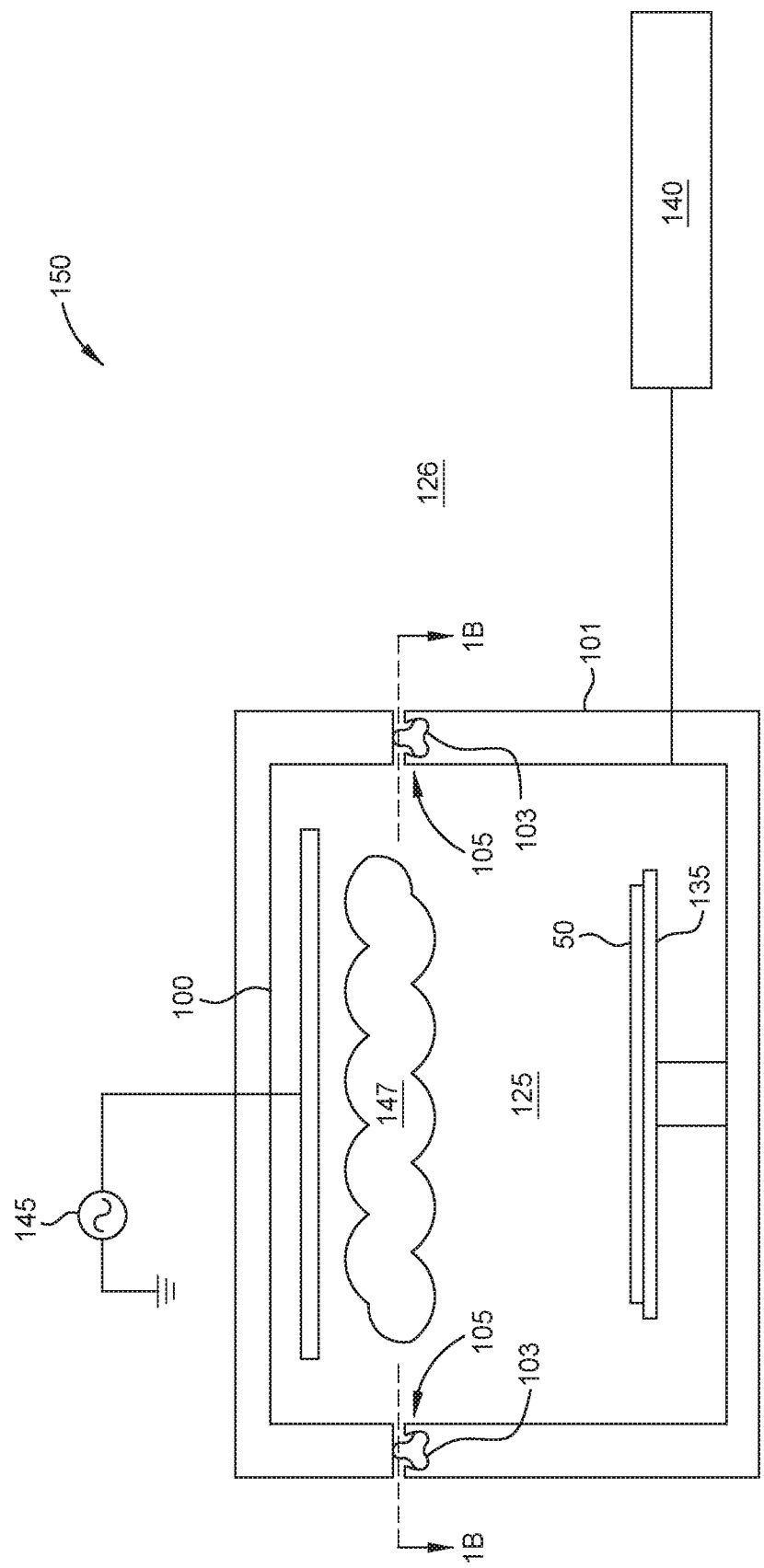

MULTINODE MULTI-USE O-RING AND METHOD FOR FORMING A SEAL

CROSS-REFERENCE TO RELATED APPLICATIONS

This application claims priority to U.S. Provisional Patent Application No. 62/700,461, filed Jul. 19, 2018, which is hereby incorporated by reference in its entirety.

BACKGROUND

Field

Embodiments of the invention relate to an apparatus and a method, and, more specifically, to a multinode multi-use O-ring and method for making a seal.

Description of the Related Art

Integrated circuits have evolved into complex devices that include millions of transistors, capacitors and resistors on a single chip. The evolution of chip designs continually requires faster circuitry and greater circuit density. As the demand for integrated circuits continues to rise, chip manufactures have demanded semiconductor processing systems having increased wafer throughput and greater product yield. To meet this increase in throughput, systems are being developed to process larger diameter wafers, for example, wafers having diameters of 300 mm and larger.

Processing chambers generally capable of processing wafers typically comprise a semiconductor wafer support assembly that includes a puck such as an electrostatic chuck (ESC), temperature controlling base having a cooling plate and heating electrodes, and a support pedestal. Other various components, such as gas lines, electrical lines, backside gas conduits, and the like are also disposed in the semiconductor wafer support assembly. During the manufacture of such semiconductor wafer support assembly, numerous O-rings are required to be placed between the components in the processing chamber and support assembly to sustain a vacuum tight seal between an internal chamber environment and the external environment. The O-rings also prevent the hostile plasma or chemical environment present in the chamber during processing from penetrating and attacking wafer support components.

One drawback with traditional O-rings is that they are subject to deterioration and outgassing after repeated processing cycles in the chamber. Constant thermal and/or chamber pressure cycling erodes the elastic properties of the O-rings. After extended use, particles eventually begin to flake off the O-ring. Such flaking generates contaminants that are undesirable, since they can drift onto a wafer during processing. These contaminants can subsequently create shorts or voids in the devices formed in the processed wafer, thereby degrading the quality of the wafer. Although replacing O-rings is a necessary part of the functioning of these semiconductor processing chambers, the harsh plasma and chemical environments that the O-rings are exposed to necessitates their replacement, which causes significant costs for the consumer.

Therefore, there is a need for durable and reusable O-rings.

SUMMARY OF INVENTION

In one embodiment, a sealing device for forming a seal between at least two separable components is provided, including a closed loop body, a plurality of sealing nodes, and a plurality of sealing antinodes. Each sealing antinode is positioned diametrically opposite to a sealing node in a cross section of the closed loop body.

In another embodiment, a processing chamber is provided, including a first separable processing chamber component having a sealing surface, a second separable processing chamber component having a component surface, wherein the second separable processing chamber component includes a channel formed in the component surface, and a sealing device. The sealing device includes a body, a plurality of sealing nodes, and a plurality of sealing antinodes. A portion of each of the sealing nodes have a surface that is configured to form a seal with at least one surface of each of the two separable processing chamber components.

In another embodiment, a method of forming a seal between a first separable component and a second separable component is provided, including compressing a sealing device between the first separable component and the second separable component, separating the first separable component and the second separable component, and reorienting the sealing device relative to the first separable component and then compressing the sealing device. The sealing device includes a body, a plurality of sealing nodes, and a plurality of sealing antinodes. A portion of at least one of the sealing nodes and sealing antinodes have a surface that is configured to form a seal with at least one surface of each of the two separable components when the sealing device is compressed. Compressing the sealing device causes a first node to form a first seal between a first sealing node and a surface of the first separable component and a second seal between a first sealing antinode and a surface of the second separable component. Compressing the sealing device after reorienting the sealing device causes a second sealing node to form a third seal between the second sealing node and the surface of the first separable component and a fourth seal between a second sealing antinode and the surface of the second separable component.

The O-rings described herein contain multiple sealing elements, allowing the O-ring to seal in multiple places. The O-ring has multiple portions that withstand damage, while protecting the other portions of the O-ring. The O-ring is rotatable and reusable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 1A is a side cross sectional view of a substrate processing chamber, according to one embodiment.

DETAILED DESCRIPTION

Figure 1B:
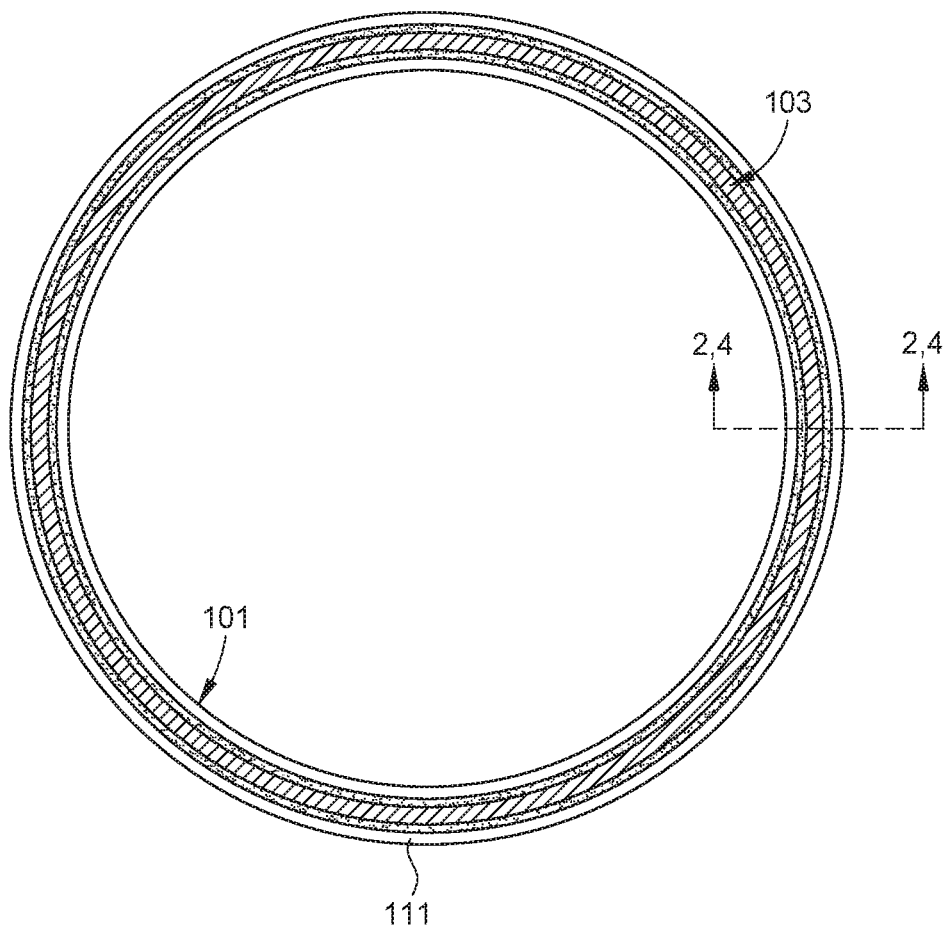
FIG. 1B is a top view of the sealing device and a groove disposed within a processing chamber component, according to one embodiment.

Embodiments of the present disclosure generally relate to a sealing device, such as an O-ring, that is used to form a seal between components of a processing chamber. In some configurations, the sealing device is placed in a groove, or recess, (i.e., channel 105 in FIG. 1) in at least one of the chamber components of the processing chamber. Embodiments of the present disclosure will also generally include a method of reusing a sealing device that has reached its useable lifetime in a first orientation relative to the groove, or recess, formed in the at least one chamber component. In some embodiments, reusing the sealing device includes reorienting the sealing device relative to the groove or recess formed in the chamber component, such as rotating the sealing device in the groove. Embodiments of the disclosure are generally useful for, but not limited to, multinode-O-rings that can be rotated and reused.

FIG. 1A is a side view of a processing chamber 150, according to one embodiment. The processing chamber 150 is disposed within an ambient environment 126. A substrate 50 sits on a base 135, and is exposed to a process plasma 147 disposed in a processing region 125 of the processing chamber 150. The plasma 147 will include ions, neutrals and radicals of a processing gas that is disposed within the processing region 125. Typical processing gases can include inert gases or reactive gases (e.g., precursors, halogen containing gases, ammonia containing gases) that are used to perform some process on the substrate 50 or on one or more of the chamber components found in the processing chamber 150. A vacuum pump 140 and radio frequency (RF) power source 145 are connected to the processing chamber 150. The outside of the processing chamber 150 includes at least two separable components that can be separated between plasma 147 generation cycles such that an O-ring 103 can be rotated or replaced. These separable components are generally referred herein to as a lower chamber component 101 and an upper chamber component 100. A channel 105 is formed in the lower chamber component 101, which is illustrated in FIG. 2 and is discussed further below.

Figure 4A:
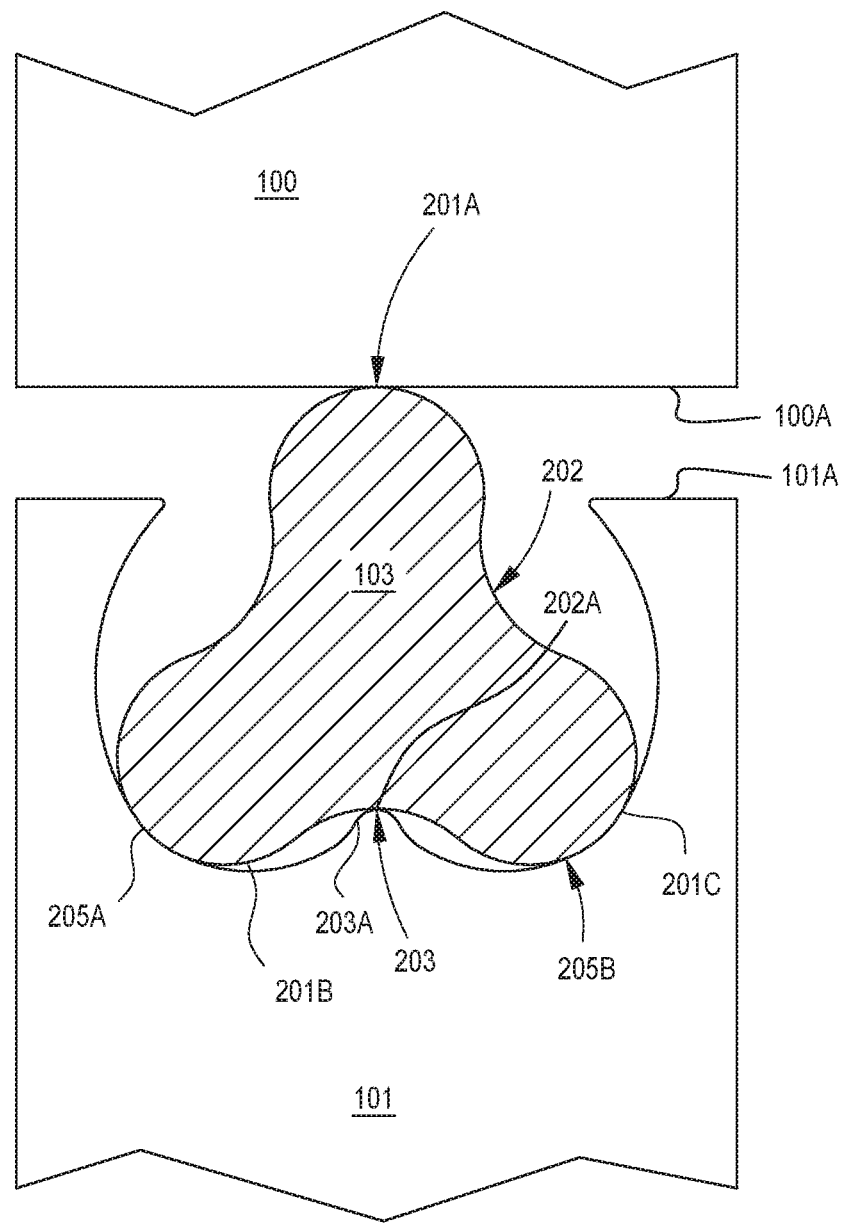
FIG. 4A is a side cross sectional view of the three sealing nodes sealing device in the groove, according to one embodiment.

FIG. 1B is a top view of a sealing device that is disposed in the channel 105 formed in a surface 111 of the lower chamber component 101, according to one embodiment. In order to simplify the description below, the sealing device will be referred to as an O-ring 103. However, the use of the term "O-ring" below is not intended to be limiting as to structural configuration of a sealing device that can be used within one or more of the embodiments of the disclosure provided herein, since the sealing device (e.g., O-ring) can have a cross-sectional shape that is a non-circular geometric shape (e.g., three lobed shape as illustrated in FIG. 4A). The sealing device has a continuous body shape that has no ends (e.g., toroid shape), according to some embodiments. The continuous body shape can be a closed loop shape, such as a circular loop, triangular loop, or rectangular loop. The sealing device can in some specialized cases have a discontinuous body shape (e.g., linear strip having two ends). The O-ring 103 is generally made of an elastic material or elastic polymeric material, such as a natural or synthetic rubber, butyl, perfluoroelastomer polymer, nitrile, silicone, Teflon™, polytetrafluoroethylene (PTFE), elastomers, or conductive polymers, according to some embodiments.

Figure 5:
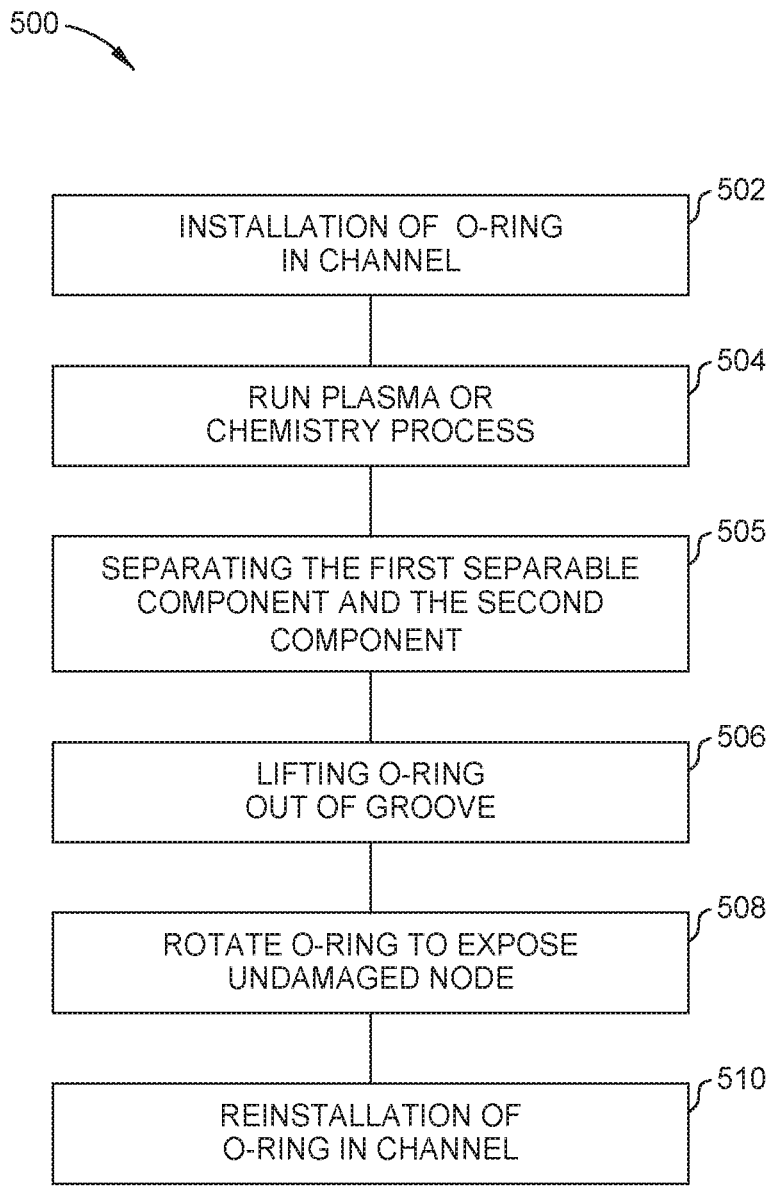
FIG. 5 illustrates a flow chart of the method of rotating the sealing device, according to one embodiment.

FIG. 5 illustrates a flow chart of a method 500 of extending the life of, or reusing, the O-ring 103, according to one embodiment. Although the method 500 operations are described in conjunction with FIGS. 2A-D and 5, persons skilled in the art will understand that any system configured to perform the method steps, in any order, falls within the scope of the embodiments described herein. The method 500 begins at operation 502, where the O-ring 103 is installed in a desired location. The O-ring 103 is compressed between the first separable component and the second separable component such that a first node of the O-ring forms a first seal between a first sealing node 201A and a surface of the first separable component, and a second seal between a first sealing antinode 202B and a surface of the second separable component. For example, the first separable component can be the upper chamber component 100, the second separable component can be the lower chamber component 101, and the O-ring 103 can be installed in the channel 105, such that sealing node 201A forms a seal with the upper chamber component 100, and that a sealing antinode 202B forms a seal with the lower chamber component 101.

Figure 2A:
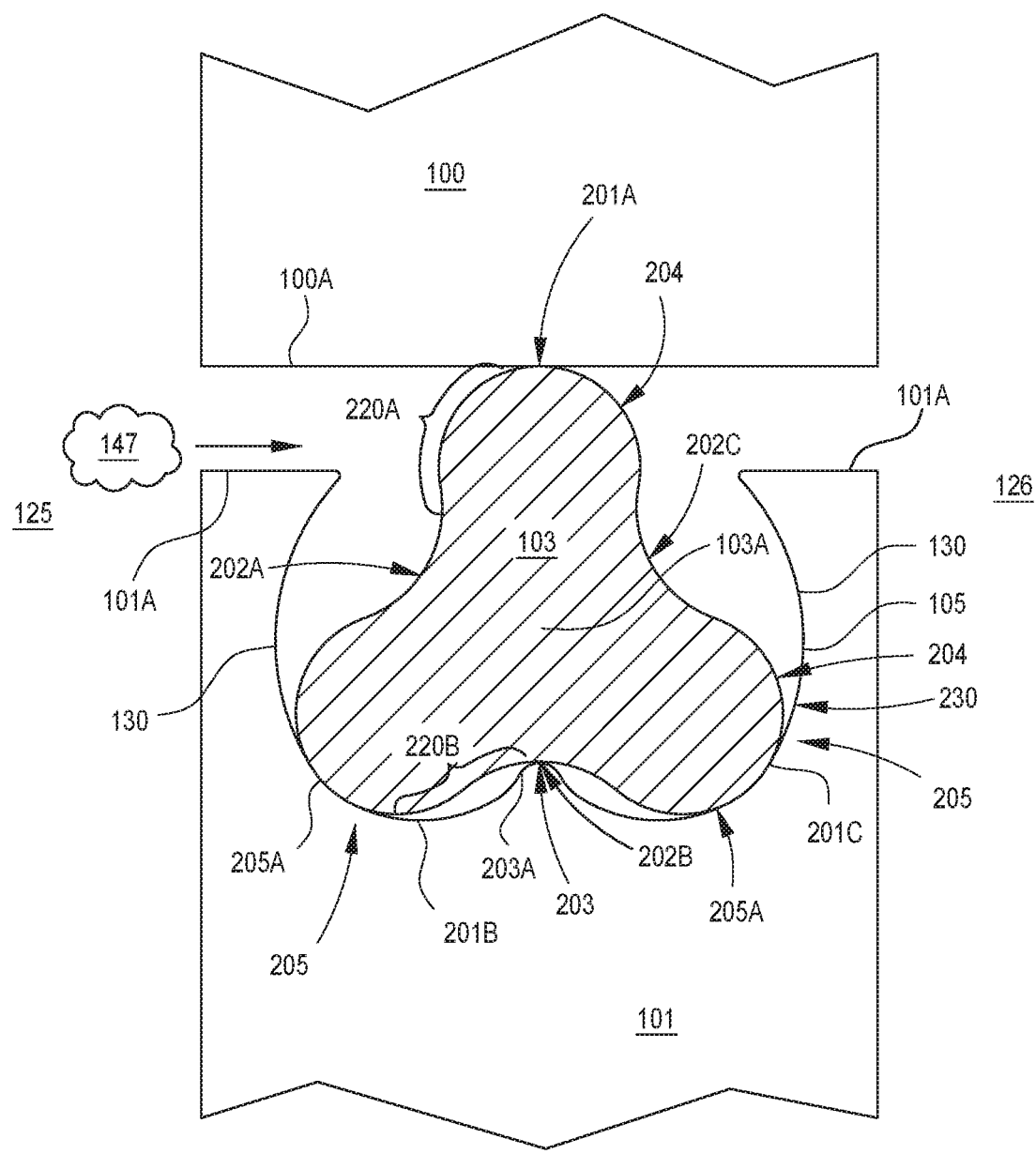
FIG. 2A is a side cross sectional view of the sealing device in the groove, according to one embodiment.

FIG. 2A is a side cross sectional view of the O-ring 103 that is positioned as described above in operation 502 within the channel 105 formed in a component surface 101A of the lower chamber component 101 of the processing chamber 150. The O-ring 103 generally includes a solid circular body 103A, a plurality of sealing nodes 201 (e.g., 201A, 201B, 201C), which form a lobed arrangement about the body 103A, and a plurality of sealing antinodes 202 (e.g., 202A, 202B, 202C). The number of sealing nodes 201 is odd, and the number of sealing antinodes 202 is odd, according to some embodiments. The O-ring can also include one or more parting lines 204 that are placed in between one or more of the sealing nodes 201 and sealing antinodes 202. The sealing nodes 201 generally have a rounded and convex shape. The sealing antinodes 202 generally have a rounded and concave shape, and are formed at the three-way intersection of two separate sealing nodes 201 and the body 103A. The O-ring 103 is configured such that each sealing antinode 202 is positioned diametrically opposite to a sealing node 201, such as, for example, sealing node 201A is diametrically opposite to sealing antinode 202B in FIG. 2A. Each sealing antinode 202 and sealing node 201 extends along an entire length of the O-ring 103 (not shown in FIG. 2B).

Figure 2B:
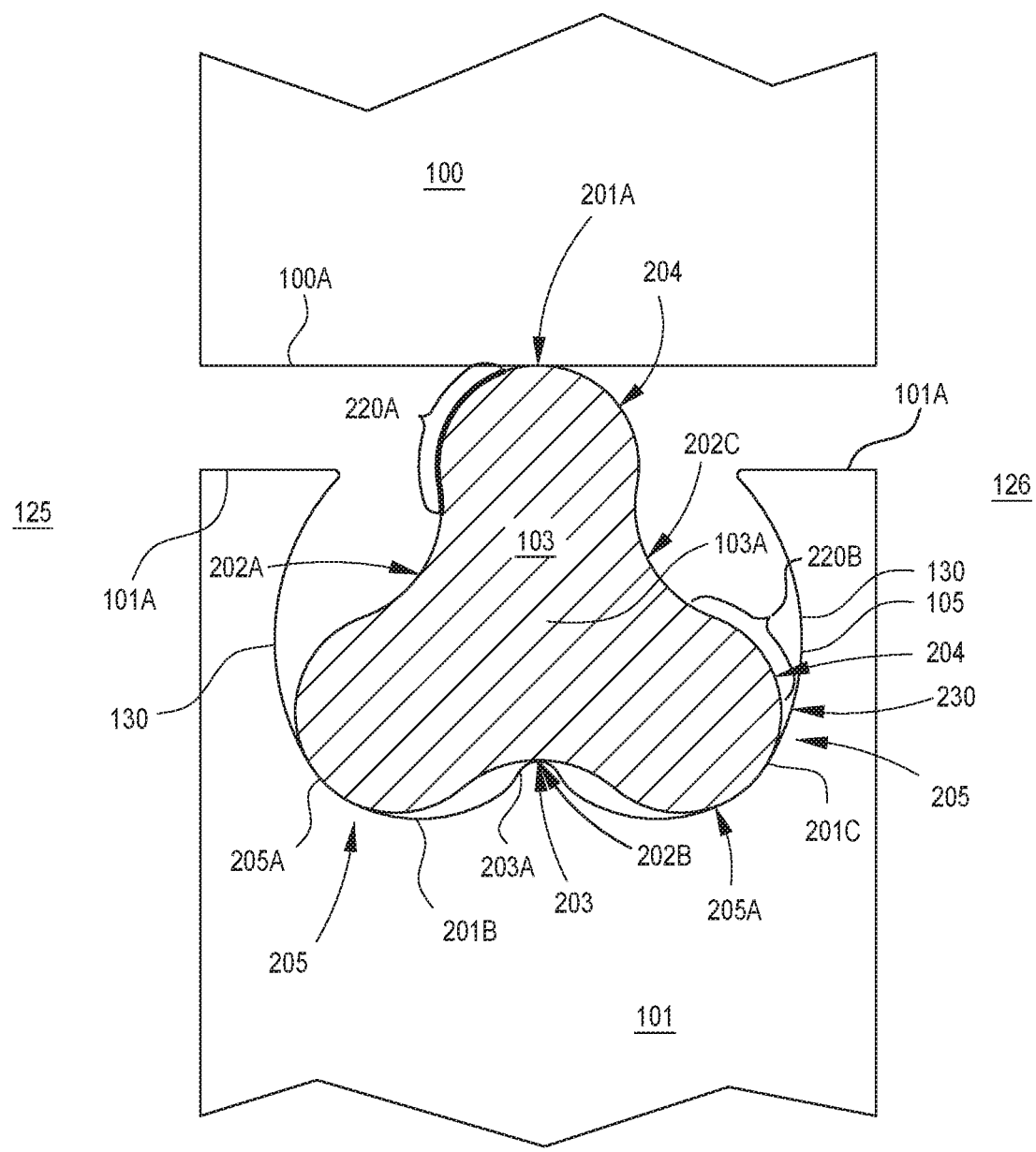
FIG. 2B is a side cross sectional view of the sealing device in the groove after process plasma had been run, according to one embodiment.
Figure 2C:
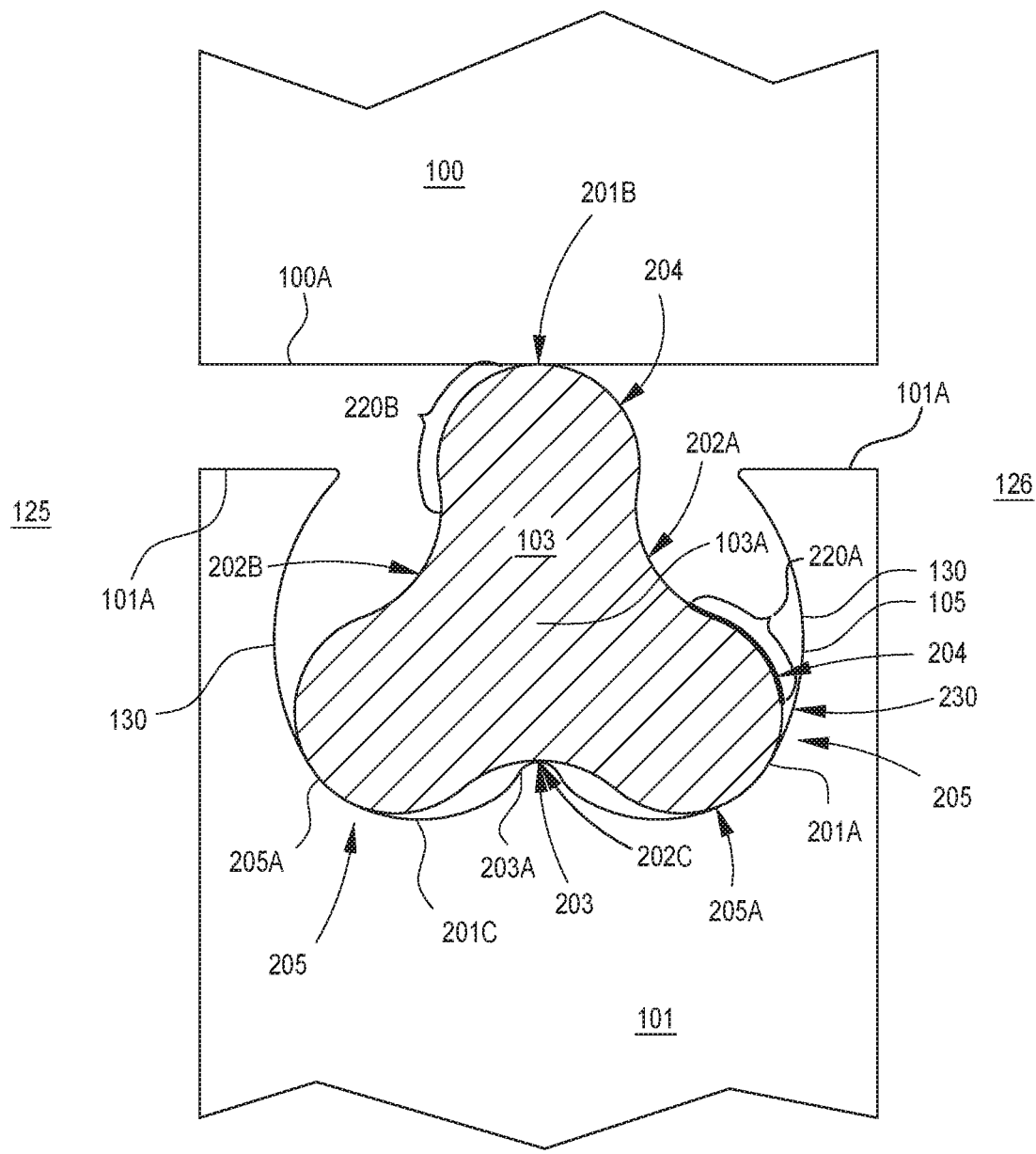
FIG. 2C is a side cross sectional view of the sealing device in the groove after process plasma had been run and the sealing device has been rotated, according to one embodiment.
Figure 2D:
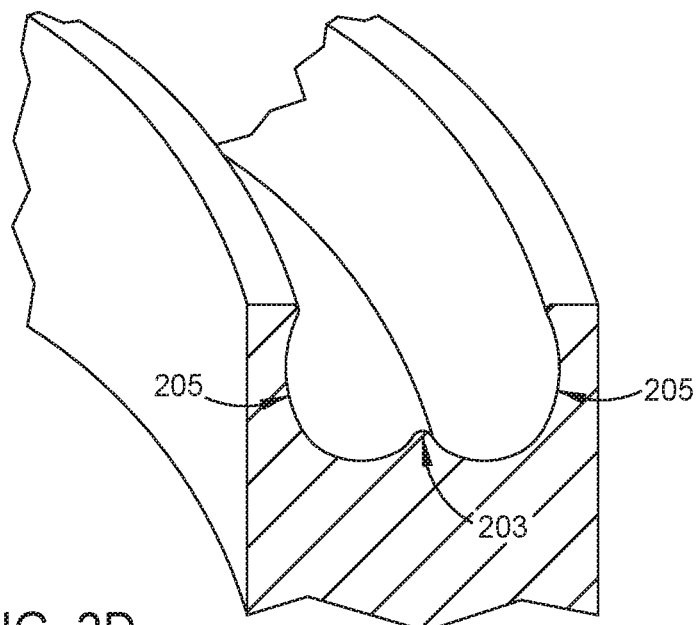
FIG. 2D is an isometric cross sectional view of the groove, according to one embodiment.

FIG. 2D is an isometric cross sectional view of a portion of the channel 105 formed in the lower chamber component 101, which includes two indentations 205 and one nodule 203, according to one embodiment of the disclosure provided herein.

As discussed above, the channel 105 is formed within the lower chamber component 101, and generally includes sidewalls 130 positioned adjacent to the surface 101A, at least two indentations 205 that are each positioned adjacent to one of the sidewalls, which generally have concave recesses in the lower chamber component 101 that are deep enough such that the sealing nodes 201B, 201C can touch the bottom of the indentations 205, and such that the sealing node 201A can form a seal with the upper chamber component 100. The channel 105 also generally includes at least one sealing nodule 203 having a sealing surface 203A, the sealing nodule separating the at least two indentations 205.

In one embodiment, the surface of the sealing nodule 203 is configured to form a seal with a sealing antinode 202 of the O-ring 103 that is positioned opposite to a sealing node 201 that also forms a seal with the component surface 100A of the upper chamber component 100 during use. In some embodiments, a portion of two or more sealing nodes 201 that are positioned on an opposite side of the O-ring from the sealing node 201 that forms a seal against the surface 100A, each form a seal with a surface 205A of the channel 105. In most conventional O-ring configurations (not shown), the O-ring only forms seals with opposing surfaces of the chamber; however, as noted above, the O-ring 103, in some embodiments, is able to form not only a seal with the surface 100A of the upper chamber component 100 and a seal with the sealing surface 203A of the sealing nodule 203, but also a seal with the surfaces 205A of the channel 105 via the adjacent nodes 201B, 201C. The O-ring 103 makes a seal when it is simultaneously contacting different portions of the sealing device; some of these embodiments are listed above. The sealing nodes 201 of the O-ring 103 also help prevent the O-ring 103 from falling out of the groove 230. In addition, the sealing nodes 201 allow for additional degrees of freedom of the O-ring 103, allowing the O-ring to withstand higher pressure without permanent deformation of the O-ring than a traditional O-ring without sealing nodes.

Due to the often aggressive nature of the processing environment in the processing region 125 during normal operation, the process chemistry excited by the plasma 147 will reach and attack the exposed surfaces of the O-ring 103, and exposed sealing surface region 220A of the O-ring 103. The plasma 147 typically attacks and/or erodes the material of the O-ring 103, altering the O-ring material's mechanical properties and reducing its sealing capability. Over time the exposed sealing surfaces of the O-ring 103 are attacked so that the quality of the process environment (e.g., vacuum level, contamination, particles) maintained in the processing region 125 degrades to a point where the O-ring can no longer maintain the needed process environment parameters (e.g., pressure, leak rate, contamination, particles) to continue processing in the processing region 125. In most conventional O-ring configurations (not shown), the only recourse at times where the O-ring has reached a point where it forms a poor seal with the mating chamber components is to replace the seal. However, as noted above, an O-ring 103 of the present disclosure that has reached its useable lifetime in a first orientation relative to the channel 105 and surface 100A can be reused after it has been reoriented relative to the channel 105 and surface 100A.

In addition, due to the configuration of the O-ring 103 and groove 230 disclosed herein, the process plasma 147 will only attack one of the sealing nodes 201A, and possibly one of the sealing antinodes 202A. The remaining sealing nodes 201B, 201C and sealing antinodes 202B, 202C are protected by their position within the channel 105. In a configuration that includes an odd number of sealing nodes 201, a sealing node 201 will form a seal against an opposing chamber component (e.g., upper chamber component 100) and the sealing antinode 202 will form a seal with the nodule 203 that is directly across from the corresponding sealing node 201. A sealing member with an even number of nodes can trap room pressure air in the area bounded between adjacent nodes and the surface 100A, which can leak into the channel 105 when high vacuum is achieved during chamber use, ruining the high vacuum necessary for successful chamber operation and film growth. An O-ring 103 with an odd number of sealing nodes 201, as described herein, does not have an area bounded between adjacent nodes and the surface 100A, as only one of the sealing nodes makes a seal with the surface 100A.

At operation 504, a plasma 147 is generated, which undesirably attacks the O-ring 103 such that it no longer maintains the needed process environment. FIG. 2B illustrates an exposed sealing surface region 220A of the O-ring 103 after the conclusion of one or more processes in the processing region 125 of the processing chamber as described above in operation 504. As shown in FIG. 2A, an exposed sealing surface region 220A has become damaged due to exposure to components of the plasma 147 over an extended period of time, such that the O-ring 103 can no longer maintain the needed process environment. Typically, the damaged portion of the sealing surface region 220A will include physical changes (e.g., formation of pits or pores in the surface of the O-ring 103) and/or material property changes within the material of the O-ring 103, such as the material's mechanical properties (e.g., hardness, % elongation, compression set, crystallinity, monomer chain length). At this point, a conventional sealing member would have to be removed from the chamber and disposed of, due to the damage incurred by the sealing member from the plasma 147. However, due to the configuration of the O-ring 103 and groove 230 disclosed herein, the O-ring 103 can be rotated such that a new exposed sealing surface region 220B can be exposed, and the plasma 147 can be run again with the same O-ring 103. The reusability of the O-ring 103 disclosed herein reduces cost to the customer and reduces time spent in replacing and disposing of the sealing member presented in the related art. The O-ring 103 can be used the number of times that there are sealing nodes 201, and thus rotated and placed one less than the number of sealing nodes 201 times.

At operation 505, the first processing chamber component and the second processing chamber component are separated. This allows for the O-ring 103 to be accessed and manipulated in the proceeding operations. For example, the upper chamber component 100 is separated from the lower chamber component 101, such that the O-ring 103 is accessible.

At operation 506, the O-ring 103 is lifted out of the previous location. For example, the O-ring 103 can be lifted out of the channel 105.

At operation 508, the O-ring 103 is reoriented to position the undamaged sealing node 201B for reinsertion into the location. For example, the O-ring 103 can be rotated. In the case of an O-ring 103 that contains three sealing nodes 201 and three antinodes 202, the O-ring 103 will be rotated 120° in this operation from a first orientation to a second orientation. In general, the O-ring 103 that contains a number of sealing nodes 201 and sealing antinodes 202, the O-ring 103 will be rotated 360°, divided by the number N of sealing nodes 201 and sealing antinodes 202, in this operation from a first orientation to a second orientation (e.g., 360°/N).

At operation 510, the O-ring 103 is reinstalled in the desired location after the O-ring has been reoriented in operation 508. The O-ring 103 is compressed between the first separable component and the second separable component such that a first node of the O-ring forms a first seal between a second sealing node 201B and a surface of the first separable component, and a second seal between a second sealing antinode 202C and a surface of the second separable component. For example, the first separable component can be the upper chamber component 100, the second separable component can be the lower chamber component 101, and the O-ring 103 can be installed in the channel 105, such that sealing node 201B forms a seal with the upper chamber component 100, and that the sealing antinode 202C forms a seal with the lower chamber component 101.

FIG. 2C illustrates the O-ring 103 after being removed in operation 506, rotated in operation 508, and installed as described above in operation 510, such that the exposed sealing surface region 220A is placed within the groove 230. The new exposed sealing surface 220B has not yet been exposed to plasma 147, and therefore the O-ring 103 is available to be used for further processing in the processing region 125. In this configuration, due to the pristine nature of the new exposed sealing surface 220B of the node 201B and the portion of the 202C that is in contact with the sealing module 203, the quality of the processing environment in the processing region 125 will be re-established.

The process operations found in method 500 can then be repeated multiple times until the O-ring 103 has reached its useable lifetime. In some embodiments, method 500 is repeated until all of the exposed sealing portions of all of the sealing nodes 201 have at least been oriented and positioned to form a seal with the upper chamber component 100. In one embodiment, operations 502-510 are serially repeated one less time than number of sealing nodes 201 and/or sealing antinodes 202.

Figure 2E:
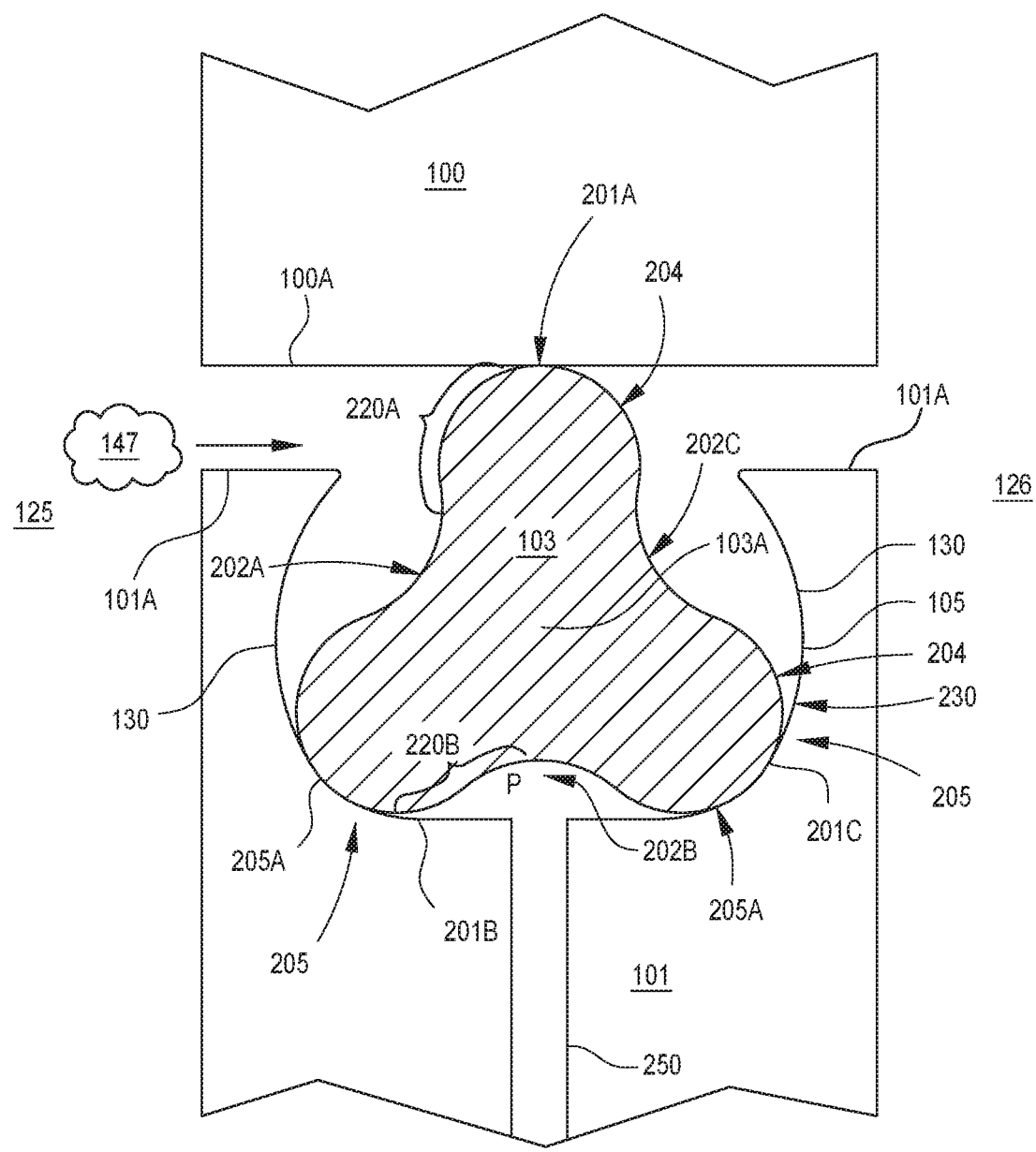
FIG. 2E is a side cross sectional view of the sealing device in the groove with an exhaust, according to one embodiment.

FIG. 2E is a side cross sectional view of the O-ring 103 in the groove 230 with an exhaust 250, according to one embodiment. In this embodiment, the sealing nodule 203 is not present, and an exhaust 250 is provided between two of the sealing nodes 201B, 201C. The exhaust 250 allows for a reduction of pressure in the area between the sealing nodes 201B, 201C (pressure indicated by P in FIG. 2E). In order to make a strong seal with the groove 230, the O-ring 103 must be pushed against the sides of the groove. Reducing the pressure P between the sealing nodes 201B, 201C reduces the contact pressure on the O-ring 103, thus enabling the O-ring to seal to higher pressure differentials.

Figure 3:
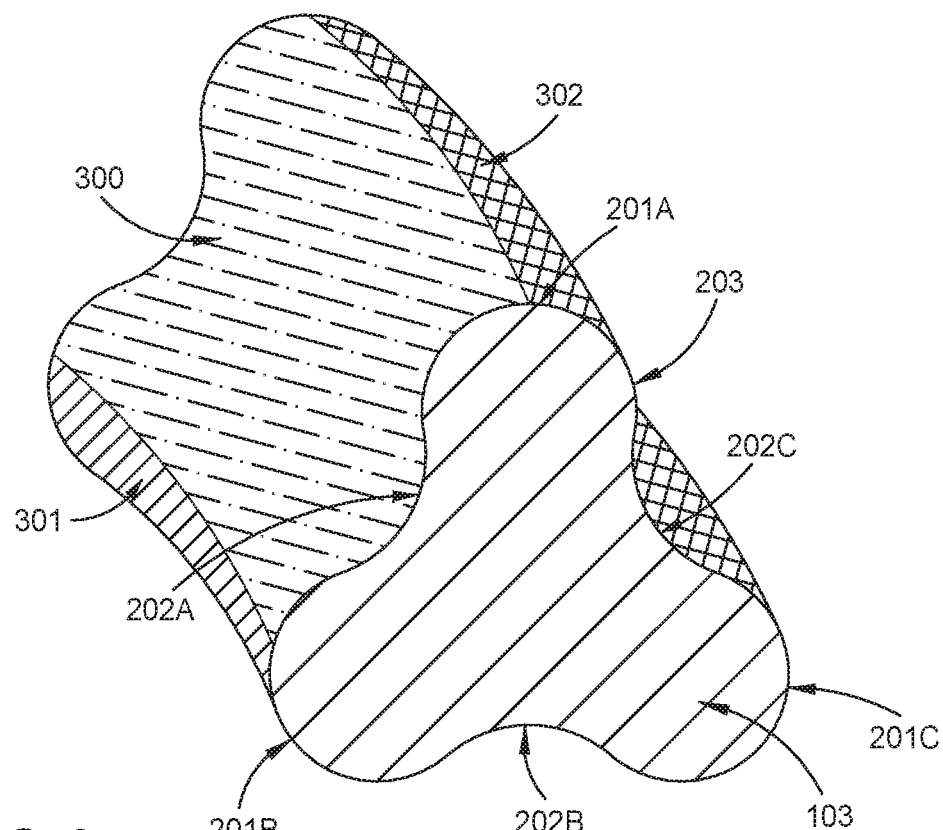
FIG. 3 is an isometric cross sectional view of the sealing device in the groove, with the different sealing colored areas shown, according to one embodiment.

FIG. 3 is an isometric cross sectional view of one embodiment of the O-ring 103 that is disposed in the channel 105. In some embodiments, as illustrated in FIG. 3, the O-ring 103 includes multiple areas that are each provided with a color. Each of the multiple areas, in some cases, can be defined as non-overlapping areas that are disposed between the tips of adjacent sealing nodes 201. In one configuration of the O-ring 103, an area 300, which spans from the top of one sealing node 201A to the next adjacent sealing node 201B, and encompasses an entire sealing antinode 202A, is colored differently from other similarly defined areas 301, 302 of the O-ring 103. In one embodiment, the area 301, which includes the surface of the O-ring 103 disposed between the top of one sealing node 201B to the next adjacent sealing node 201C and the sealing antinode 202B, includes a color that is different from the color found within the area 300 of the O-ring 103.

In another embodiment, the area 302, which includes the surface of the O-ring 103 disposed between the top of one sealing node 201C to the next adjacent sealing node 201A and the sealing antinode 202C, includes a color that is different from the color found within the area 300 and the area 301 of the O-ring 103. The differently colored areas 300, 301, 302 make it easy to determine 1) the orientation of the O-ring 103 in channel 105, 2) if the O-ring 103 is twisted or not twisted within the channel 105, and 3) the stage of life the O-ring 103 is in, and how many more times it can be rotated without needing to be replaced. When plasma 147 damages area 300, the O-ring 103 can be lifted out of channel 105, rotated, and placed such that the undamaged area 301 is in the place where area 300 used to be in channel 105, as described in method 500. When area 300 undergoes sufficient damage from plasma 147 such that the O-ring 103 can no longer maintain the needed process environment, the O-ring 103 can be designed so that the damage created in the material will cause the color to change due to a change in the molecular structure of the O-ring 103 material. In this case the change in the color of the damaged region of the O-ring 103 can be compared with an un-attacked portion of the O-ring 103 that has the original base color of the O-ring 103. This is another indicator for the user that the orientation of the O-ring 103 will need to be rotated, and a new undamaged area 301 will need to be exposed in order to maintain the needed process environment.

In some sealing device formation processes, the color of each of the surfaces of the O-ring 103 is created by adding one or more pigments to a portion of the resin or precursor formulation used to form the material that forms the O-ring 103. In another formation process, an organic solvent in which a colored pigment is dispersed is delivered to the area 300, 301, 302 that is to be colored to form colored coating. In some configurations, a pigment containing solvent is used to modify the area 300, 301, 302 that is to contain the desired color. In some configurations, the body 103A of the O-ring 103 includes a polymeric material, and at least a portion of the polymeric material disposed on a surface of the body includes a pigment that is added to the polymeric material to alter the color of the unpigmented material.

FIG. 4A is a cross sectional view of an O-ring 103 with three sealing nodes 201 and three sealing antinodes 202, placed in channel 105, according to one embodiment. The channel 105 has one nodule 203 and two indentations 205. During use within the processing chamber 150, the sealing node 201A forms a seal against a surface 100A of the upper chamber component 100. The surface 203A of the sealing nodule 203 is configured to form a seal with a sealing antinode 202A of the O-ring 103 that is positioned opposite to a sealing node 201A that forms a seal with the surface 100A of the upper chamber component 100. A portion of two more sealing nodes 201B, 201C that are positioned on an opposite side of the O-ring 103 than the sealing node 201A, which forms a seal against the surface 100A, is positioned, each also form a seal with a surface 205A, 205B of the channel 105. A portion of at least one of the sealing nodes 201 has a surface that is configured to form a seal with at least one surface of one of the two separable components when the O-ring 103 is disposed within the channel 105, and the two separable components are positioned to simultaneously contact different portions of the O-ring, according to one embodiment.

Figure 4B:
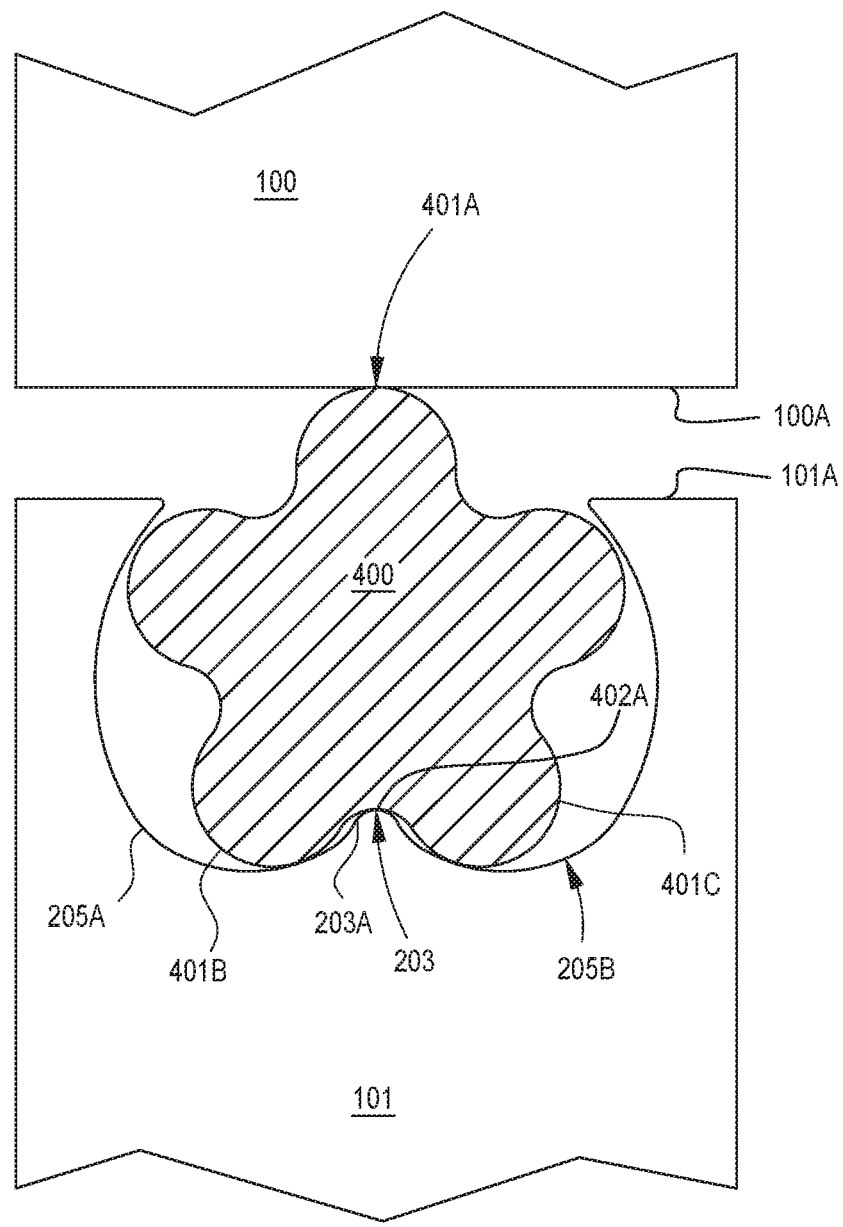
FIG. 4B is a side cross sectional view of the five sealing node sealing device in the groove, according to one embodiment.

FIG. 4B is a cross sectional view of an O-ring 400 with five sealing nodes 401 and five sealing antinodes 402, which is positioned within the channel 105, according to one embodiment. The nodule 203 seals with a sealing antinode 402, and the upper chamber component 100 seals with one sealing node 401. In one example, during use within the processing chamber, the sealing node 401A forms a seal against a surface 100A of the upper chamber component 100. The surface 203A of the sealing nodule 203 is configured to form a seal with a sealing antinode 402A of the O-ring 400 that is positioned opposite to a sealing node 401A that forms a seal with the surface 100A of the upper chamber component 100. A portion of two more sealing nodes 401B, 401C, which are positioned on an opposite side of the O-ring 400 than the sealing node 401A, forms a seal against the surface 100A by forming a seal with a surface 205A, 205B of the channel 105.

Figure 4C:
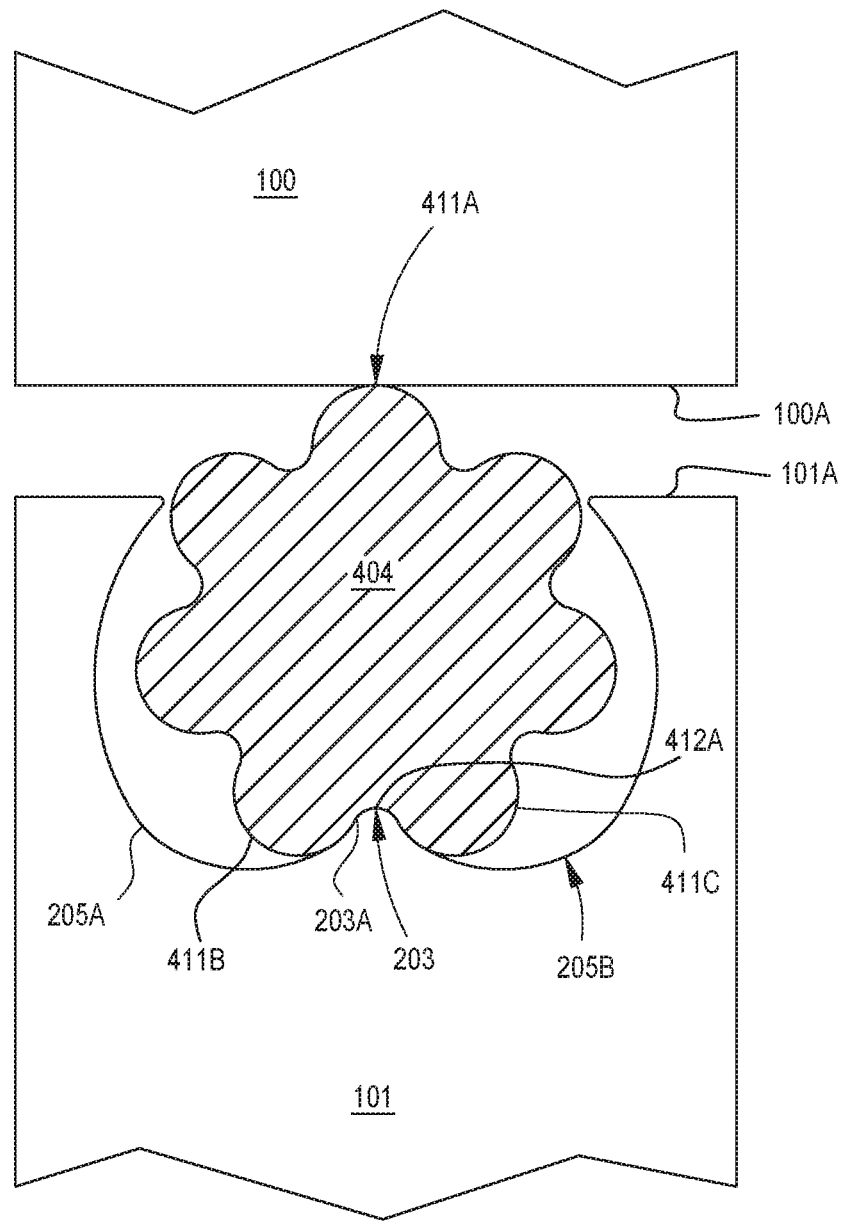
FIG. 4C is a side cross sectional view of the seven sealing node sealing device in the groove, according to one embodiment.

FIG. 4C is a cross sectional view of an O-ring 404 with seven sealing nodes 411 and seven sealing antinodes 412, which is positioned in channel 105, according to one embodiment. The nodules 203 seals with sealing antinodes 412, and the upper chamber component 100 seals with one sealing node 411. During use within the processing chamber, the sealing node 411A forms a seal against a surface 100A of the upper chamber component 100. The surface 203A of the sealing nodule 203 is configured to form a seal with a sealing antinode 412A of the O-ring 404 that is positioned opposite to a sealing node 401A that forms a seal with the surface 100A of the upper chamber component 100. A portion of two more sealing nodes 411B, 411C, which are positioned on an opposite side of the O-ring than the sealing node 411A, forms a seal against the surface 100A, by forming a seal with a surface 205A, 205B of the channel 105.

As shown above, the O-ring 103 contains a plurality of nodes 201 and a plurality of antinodes 220. The O-ring 103 at least seals via a node 201 at the upper chamber component 100, and at least seals via an antinode 220 at the lower chamber component 101. During use of the processing chamber 150, portions of the O-ring 103 can be damaged, and thus the O-ring is rotated such that an undamaged portion of the O-ring is further exposed to the process environment.

The O-ring 103 is reusable, reducing cost to the user. In addition, the O-ring 103 can have colored portions, making it easy to see whether the O-ring has been placed correctly in the channel 105, and also whether the O-ring is undamaged, or if the O-ring needs to be rotated.

While the foregoing is directed to embodiments of the present disclosure, other and further embodiments of the disclosure may be devised without departing from the basic scope thereof, and the scope thereof is determined by the claims that follow.

What is claimed is:

1. A method of forming a seal between a first separable component and a second separable component, comprising:
    compressing a sealing device between the first separable component and the second separable component, wherein the second separable processing chamber component comprises a channel formed in the component surface, wherein the channel consisting essentially of a sealing nodule separating at least two indentations, the indentations in the form of concave recesses;
    a sealing device comprising:
        a body having a cross-sectional profile that is symmetrical about a center of the profile;
        a plurality of sealing nodes comprising an odd number of sealing nodes having substantially the same shape, the sealing nodes symmetrically arranged about the center of the profile; and
        a plurality of sealing antinodes, wherein a portion of at least one of the sealing nodes has a surface that contacts and forms a seal with at least one surface of the first separable processing chamber component and at least two of the sealing nodes has a surface contacting the indentations of the second separable processing chamber component, wherein there are three sealing nodes and three sealing antinodes;
    wherein a portion of a surface of a first sealing node of the plurality of sealing nodes and a portion of a surface of a first sealing antinode of the plurality of sealing antinodes each comprise a first color, wherein the first color is different than a second color found on a portion of a surface of a second sealing node of the plurality of sealing nodes and a portion of a surface of a second sealing antinode of the plurality of sealing antinodes;
    separating the first separable component and the second separable component; and
    reorienting the sealing device relative to the first separable component and then compressing the sealing device, wherein compressing the sealing device after reorienting the sealing device causes a second sealing node to form a third seal between the second sealing node and the surface of the first separable component and a fourth seal between a second sealing antinode and the surface of the second separable component.

2. The method of claim 1, wherein a number of sealing antinodes in the plurality of sealing antinodes is an odd number, wherein sealing nodes are projections and sealing antinodes are recesses between sealing nodes.

3. A processing chamber, comprising:
    a first separable processing chamber component having a sealing surface;
    a second separable processing chamber component having a component surface, wherein the second separable processing chamber component comprises a channel formed in the component surface, wherein the channel consisting essentially of a sealing nodule separating at least two indentations, the indentations in the form of concave recesses; and
    a sealing device comprising:
        a body having a cross-sectional profile that is symmetrical about a center of the profile;
        a plurality of sealing nodes comprising an odd number of sealing nodes having substantially the same shape, the sealing nodes symmetrically arranged about the center of the profile; and
        a plurality of sealing antinodes, wherein a portion of at least one of the sealing nodes has a surface that contacts and forms a seal with at least one surface of the first separable processing chamber component and at least two of the sealing nodes has a surface contacting the indentations of the second separable processing chamber component, wherein there are three sealing nodes and three sealing antinodes; and
        wherein a portion of a surface of a first sealing node of the plurality of sealing nodes and a portion of a surface of a first sealing antinode of the plurality of sealing antinodes each comprise a first color, wherein the first color is different than a second color found on a portion of a surface of a second sealing node of the plurality of sealing nodes and a portion of a surface of a second sealing antinode of the plurality of sealing antinodes.

4. The processing chamber of claim 3, wherein the sealing device comprises an elastic material.

5. The processing chamber of claim 3, wherein a number of sealing antinodes in the plurality of sealing antinodes is an odd number, wherein sealing nodes are projections and sealing antinodes are recesses between sealing nodes.

6. The processing chamber of claim 3, wherein the body is formed in the shape of toroid.

7. The processing chamber of claim 3, wherein the body is a closed loop.

8. The processing chamber of claim 3, wherein each sealing antinode is positioned diametrically opposite to a sealing node in a cross section of the body.

9. The process chamber of claim 3, wherein a surface of the sealing nodule of the channel is configured to form a seal with a surface of the plurality of sealing antinode s.

10. The process chamber of claim 3, wherein the sealing surface of the first separable processing chamber component is substantially planar.

\* \* \* \* \*